United States Patent [19]
Nyhus

[11] Patent Number: 5,727,757
[45] Date of Patent: Mar. 17, 1998

[54] SLOTTED CAM CONTROL SYSTEM

[75] Inventor: Daniel A. Nyhus, Gilbert, Ariz.

[73] Assignee: McDonnell Douglas Helicopter Co., Mesa, Ariz.

[21] Appl. No.: 587,666

[22] Filed: Jan. 17, 1996

[51] Int. Cl.[6] .................................................. B61L 5/00
[52] U.S. Cl. .................... 244/221; 244/220; 244/75 R; 74/110
[58] Field of Search ........................ 244/24, 230, 220, 244/75 R, 225; 74/110, 99 R, 107

[56] References Cited

U.S. PATENT DOCUMENTS

| 417,246 | 12/1889 | Hopper | 74/107 |
|---|---|---|---|
| 809,693 | 11/1906 | Johnston | 74/107 |
| 2,082,172 | 6/1937 | Mignet | 244/225 |
| 3,393,882 | 7/1968 | Soulez-Lariviere et al. | 244/221 |
| 3,396,597 | 8/1968 | Dean | 244/221 |
| 3,659,810 | 5/1972 | Robertson | 244/225 |
| 4,200,252 | 4/1980 | Logan et al. | |
| 4,593,573 | 6/1986 | Bond | 74/107 |

*Primary Examiner*—Andres Kashnikow
*Assistant Examiner*—Tien Dinh
*Attorney, Agent, or Firm*—Donald E. Stout; Keaton R. Mullins

[57] ABSTRACT

The present invention provides a slotted cam control system for controlling pitch angles of fan blades of a relatively low-pressure-ratio fan within a fuselage of a helicopter. The stream of air generated by the fan is directed into the tailboom of the helicopter, and is selectively discharged through the circulation control tailboom and left and right openings of a direct jet thruster. A force-receiving arm of a slotted cam control system receives left and right forces from corresponding left and right foot rudder pedals. An end of the force-receiving arm fits into a V-shaped cam. When the pilot depressed a left foot rudder pedal and releases a right foot rudder pedal, for example, the end of the force receiving-arm is first moved along a first predetermined distance of the V-shaped cam in order to decrease the pitch angles of the fan blades while the opening of the direct jet thruster corresponding to the released foot rudder pedal is closed. Next, the end of the force-receiving arm passes the pheochrome of the V-shaped slot and passes along a second predetermined distance of the V-shaped slot in order to increase the pitch angles of the fan blades as the opening of the direct jet thruster corresponding to the depressed foot rudder pedal. A force-applying arm is connected to the end of the force-receiving arm that moves within the V-shaped slot, and this force-applying arm applies to each of the fan blades to change the pitch angles.

29 Claims, 3 Drawing Sheets

SLOTTED CAM CONTROL SYSTEM

BACKGROUND OF THE INVENTION

The present invention relates generally to mechanical control systems for providing quick reversal of motion and, more particularly, to a slotted cam control system for controlling the pitch angles of fan blades within the interior of a helicopter.

The helicopter 11 shown in FIG. 1 incorporates a direct jet thruster instead of a tail rotor. One prior art reference to Logan et al (U.S. Pat. No. 4,200,252), issued on Apr. 29, 1980, discloses such a direct jet thruster, the contents of which are incorporated herein by reference. The helicopter 11 includes a main rotor 13, which rotates in a counterclockwise direction about the axis 15 to provide lift. A fuselage 17 is suspended beneath the main rotor 13. The fuselage 17 includes a cabin 19 for housing the pilot and other occupants, a tailboom 21, a main power plant 23, and a transmission 25.

In place of a tail rotor, the helicopter 11 uses a direct jet thruster, which comprises a left opening 31 and a right opening 33. A subsonic low-pressure-ratio fan 27 blows a stream of air into the tailboom 21. The compressed air in the tailboom 21 can be selectively discharged through either a circulation control slot on the right side of the tailboom 29, the left opening of the direct jet thruster 31, or the right opening of the direct jet thruster 33. Pressurized air from the subsonic low-pressure-ratio fan 27 is discharged through the circulation controlled tailboom 29 in order to counteract a torque generated by the counterclockwise rotation of the main rotor 13. This counterclockwise rotation of the main rotor 13 tends to push the tailboom 21 toward the right (out of the paper), and the discharged air through the circulation control tailboom 29 tends to push the tailboom 21 to the left. The net forces on the tailboom 21 from the main rotor 13 and the discharged air through the circulation control tailboom 29 are engineered to cancel each other out.

In addition to being utilized by the circulation control tailboom 29, the pressurized air from the subsonic low-pressure-ratio fan 27 can be utilized by the right opening 33 of the direct jet thruster to push the tailboom 21 to the left and cause the helicopter 11 to turn right. The pressurized air from the subsonic low-pressure-ratio fan 27 can similarly be discharged through the left opening 31 of the direct jet thruster in order to push the tailboom 21 to the right and cause the helicopter 11 to turn left. Only one of the left opening 31 and the right opening 33 of the direct jet thruster is open at any given time.

When one of the two openings 31, 33 of the direct jet thruster is partially open, the pitch angles of the blades of the subsonic low-pressure-ratio fan 27 are adjusted to generate relatively small stream of air. When one of the two openings, 31, 33 of the direct jet thruster is completely open, the pitch angles of the blades of the subsonic low-pressure-ratio fan 27 are adjusted to generate a relatively large stream of air. Thus, the pitch angles of the blades of the subsonic low-pressure-ratio fan 27 are adjusted according to the size of either the left opening 31 or the right opening 33 of the direct jet thruster. When both of the openings 31, 33 of the direct jet thruster are closed, the pitch angels of the blades of the subsonic low-pressure-ratio fan 27 are adjusted to provide a relatively small stream of air, which is utilized only by the circulation control tailboom 29.

The pilot of the helicopter 11 controls the sizes of the left opening 31 and the right opening 33 of the direct jet thruster with a left foot rudder pedal and a right foot rudder pedal, respectively. When the left foot rudder pedal is completely depressed, the right opening 33 of the direct jet thruster is completely open, and when the right foot rudder pedal is completely depressed, the left opening 31 of the direct jet thruster is completely open. The left foot rudder pedal and the right foot rudder pedal move inversely to one another. Thus, when the left foot rudder pedal is completely depressed, the right foot rudder pedal is not depressed, and when the right foot rudder pedal is completely depressed, the left foot rudder pedal is not depressed.

The left and right foot rudder pedals also control the pitch angles of the blades of the subsonic low-pressure-ratio fan 27. FIG. 2 shows a conventional apparatus for controlling the pitch angles of the fan blades in response to the left and right foot rudder pedal positions. The left and right foot rudder pedals are mechanically linked to the gear-driven wheel 35. As shown by arrow A1, a left foot rudder pedal depression rotates the gear-driven wheel 35 in a counterclockwise direction, and a right foot rudder pedal depression rotates the gear-driven wheel 35 in a clockwise direction. A control rod 43 is connected to the gear-driven wheel 35. As the gear-driven wheel 35 rotates, the left end of the control rod 43 is moved, as well. When the right foot rudder pedal is fully depressed, the left end of the control rod 43 is held at the full right foot rudder pedal position 37. If the pilot were then to release the right foot rudder pedal and fully depress the left foot rudder pedal, the left end of the control rod 43 would be moved counterclockwise with rotation of the gear-driven wheel 35 to the full left foot rudder pedal position 39.

The control rod 43 is mechanically linked to the fan 27. Movement of the control rod 43 thus changes the pitch angles of the blades of the fan 27. Movement of the control rod 43 in the direction of the arrow A2 changes the pitch angle of the fan blades. Movement of the control rod 43 to the left increases the pitch angles of the fan blades, and movement of the control rod 43 to the right decreases the pitch angles of the fan blades.

As an example, when neither the left foot rudder pedal nor the right foot rudder pedal is depressed, the left end of the control rod 43 rests in the neutral position 41 to thereby achieve a minimum pitch angle of the fan blades. When the user fully depresses the right foot rudder pedal, the left end of the control rod 43 moves about an inner circumference path 44 to the full right foot rudder pedal position 37, thus increasing the pitch angles of the fan blades. As the pilot releases the right foot rudder pedal and depresses the left foot rudder pedal, the left end of the control rod 43 moves along the inner circumference path 44 in a counterclockwise direction to the full left foot rudder pedal position 39. During this movement, the pitch angles of the fan blades are first decreased until the left end of the control rod 43 reaches the neutral position 41, and then the pitch angles of the fan blades are increased until the left end of the control rod 43 reaches the full left foot rudder pedal position 39. Thus, as the left end of the control rod 43 moves from the full right foot rudder pedal position 37 to the full left rudder pedal position 39, the pitch angles of the fan blades are first decreased and then increased.

As previously mentioned, only one of the left and right openings 31, 33 of the direct jet thruster may be open at any given moment. Thus, when the direct jet thruster changes from one side to the other, the pitch angles of the fan blades must first decrease while the direct jet thruster area is being closed on the one side, and then the pitch angles of the fan blades must increase while the direct jet thruster is being opened on the other side. This change in the pitch angles of the fan blades must occur quickly to mirror the changes in the openings 31, 33 of the direct jet thruster. The control system of FIG. 2, however, is sinusoidal in nature, and thus has a "flat spot" 45 in the region of motion reversal. FIG. 3 illustrates a plot 47 of fan blade pitch angle versus percent pedal depression. The region providing the motion reversal 49 shows the flat spot. A need has existed in the prior art for a control system for providing quick and crisp reversal of motion of the pitch angles of the fan blades when one direct jet thruster opening is closed and the other is opened.

SUMMARY OF THE INVENTION

The present invention provides a slotted cam control system for controlling pitch angles of fan blades of a relatively low-pressure-ratio fan within a fuselage of a helicopter. The stream of air generated by the fan is directed into the tailboom of the helicopter, and is selectively discharged through the circulation control tailboom and through left and right openings of a direct jet thruster. A force-receiving arm of a slotted cam control system receives left and right forces from corresponding left and right foot rudder pedals. An end of the force-receiving arm fits into a V-shaped cam. When the pilot depresses a left foot rudder pedal and releases a right foot rudder pedal, for example, the end of the force receiving-arm is first moved along a first predetermined distance of the V-shaped cam in order to decrease the pitch angles of the fan blades while the opening of the direct jet thruster corresponding to the released foot rudder pedal is closed.

Next, the end of the force-receiving arm passes the fulcrum of the V-shaped slot and passes along a second predetermined distance of the V-shaped slot in order to increase the pitch angles of the fan blades as the opening of the direct jet thruster corresponding to the depressed foot rudder pedal. A force-applying arm is connected to the end of the force-receiving arm that moves within the V-shaped slot, and this force-applying arm applies to each of the fan blades to change the pitch angles.

The present invention, together with additional features and advantages thereof, may best be understood by reference to the following description taken in connection with the accompanying illustrative drawings.

DETAILED DESCRIPTION OF THE PREFERRED EMBODIMENT

Figure 4:
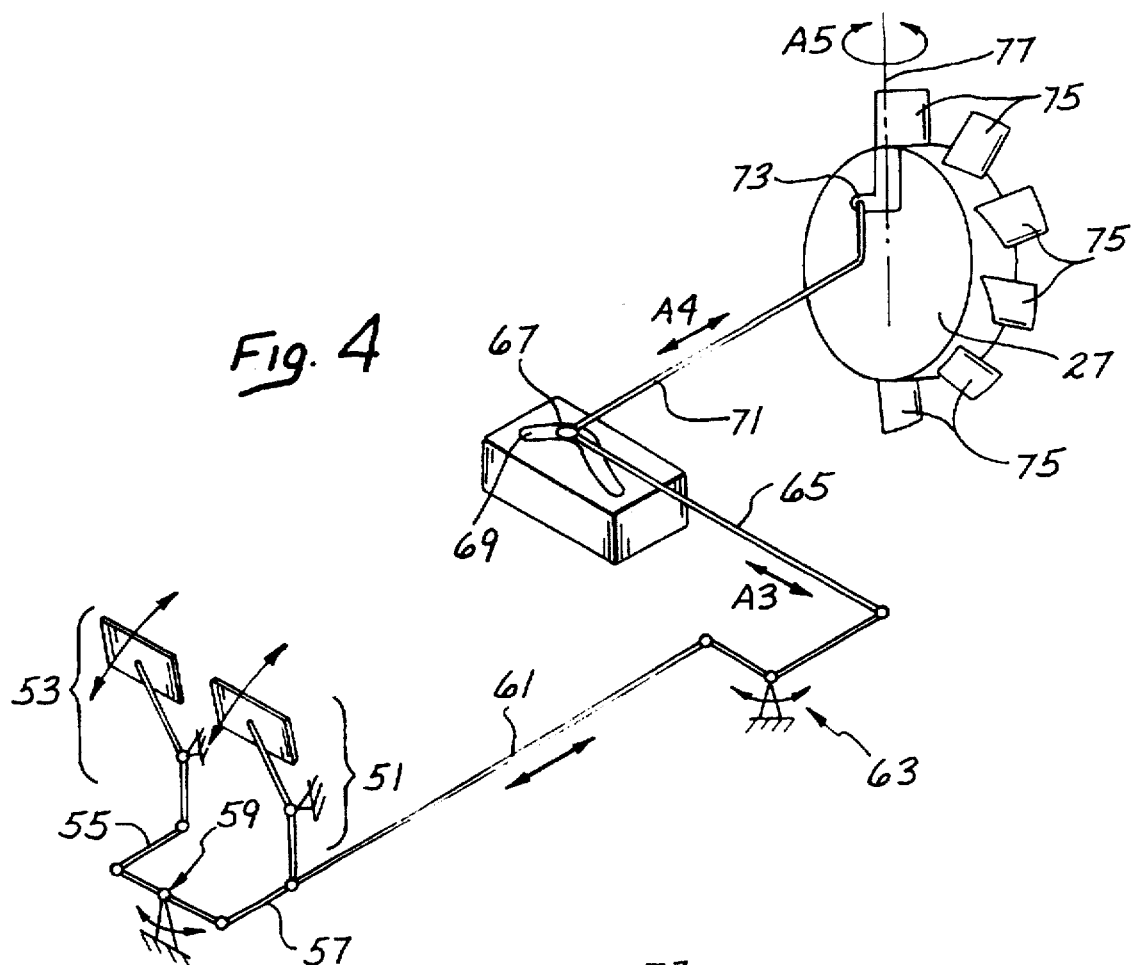
FIG. 4 is a schematic perspective view of the slotted cam control system according to the present invention.

The slotted cam control system of the presently preferred embodiment is shown in FIG. 4. The pilot of the helicopter depresses a left foot rudder pedal 51 to steer the helicopter to the right, and depresses a right foot rudder pedal 53 to steer the helicopter to the left. A left link 57 and a right link 55 connect the left and right foot rudder pedals 51, 53 to a bellcrank 59. The bellcrank 59 translates the left and right foot rudder pedal 51, 53 motion into motion along a control arm 61. Another bellcrank 63 converts the motion along the control arm 61 into motion along a force-receiving arm 65. A roller 67 is connected to an end of the force-receiving arm 65. This roller 67 moves within a V-shaped cam slot 69.

Also attached to the roller 67 is a force-applying arm 71, which is connected to a pitch arm 74. The roller 67 and cam slot 69 convert motion along the force-receiving arm 65, indicated by arrow A3, into motion along the force-applying arm 71, indicated by the arrow A4. This motion along the force-applying arm 71 moves a pitch arm 74 of each fan blade 75 to thereby rotate the respective fan blade 75 about a fan blade axis 77. A minimum pitch angle of each fan blade is achieved when the fan blade causes little wind resistance, and a maximum pitch angle is achieved for each fan blade when that fan blade achieves a maximum wind resistance when the fan is rotated.

Figure 5:
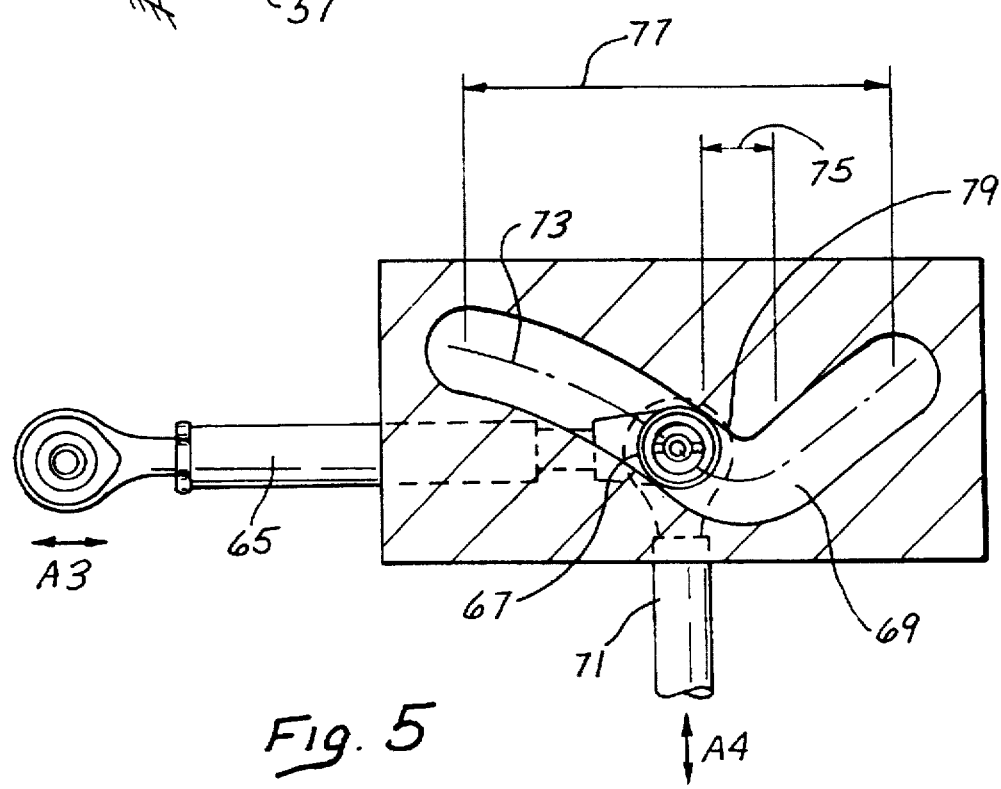
FIG. 5 is a top planar of view of the slotted cam control system of the present invention.

The roller 67 preferably comprises two wheels, which fit within the cam slot 69. In the presently preferred embodiment, the width of the cam slot 69 is approximately one-half inch, and the depth of the cam slot 69 is approximately one-eighth inch. FIG. 5 shows a top view of the roller 67 and cam slot 69. Unlike the prior art gear-driven control system, the slotted cam control system of the presently preferred embodiment can be designed to facilitate any desired reversal of motion of the pitch angles of the fan blades.

In the presently preferred embodiment, the cam shape 73 is programmed to have an approximate V-shape. The total side-to-side travel of the roller 67 within the slot 69 is indicated at 77, and the transition region where the pitch angles of the fan blades must reverse motion is shown at 75. This transition region 75 provides a much quicker transition from the decreasing pitch angles of the fan blades to the increasing pitch angles of the fan blades.

The curvature near the center of the cam slot 69, referred to as the cam fillet radius 79, controls the width of the transition region 75. For example, the cam fillet radius 79 may be decreased to provide a quicker transition from decreasing pitch angles of fan blades to increasing angles of fan blades and to thereby decrease the transition region 75. In addition to changing the cam fillet radius 79, the size of the roller diameter may be reduced to decrease the size of the transition region 75 and to increase the total side to side travel 77 of the roller.

Figure 1:
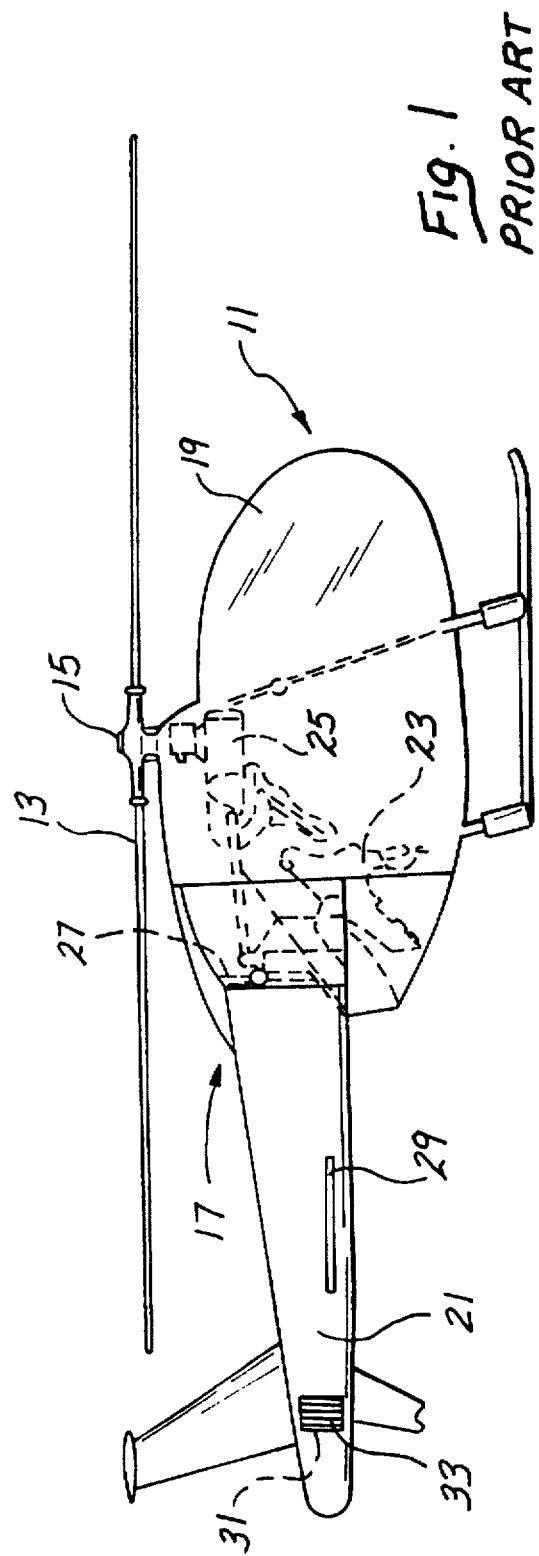
FIG. 1 is a side elevation view of a helicopter of the prior art.
Figure 2:
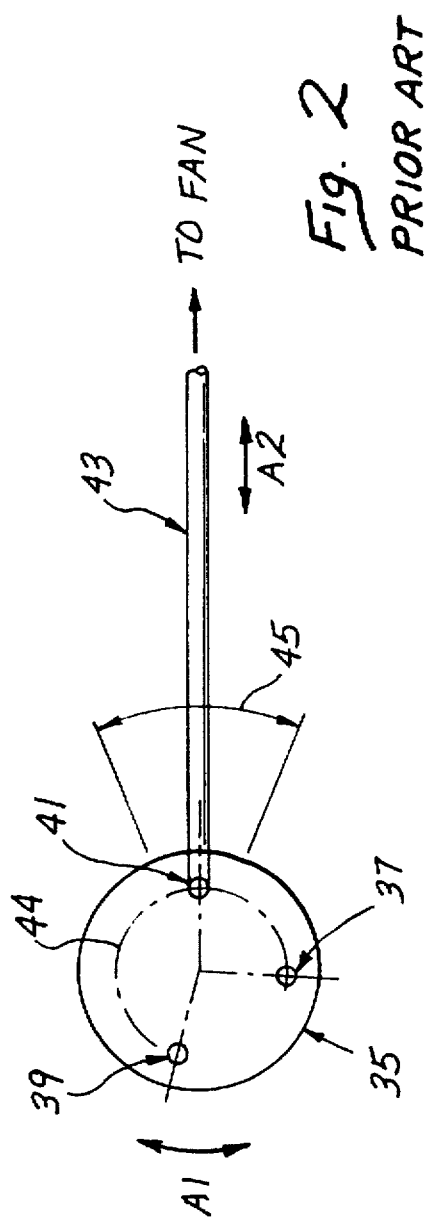
FIG. 2 is a top planner view of a gear-driven control system according to the prior art.
Figure 3:
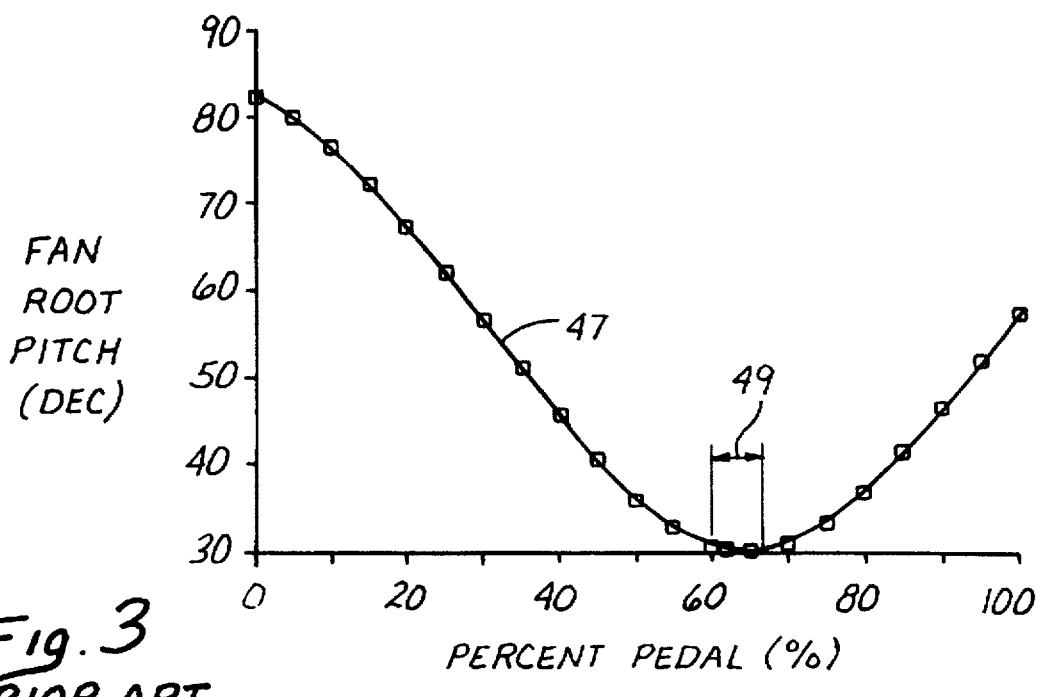
FIG. 3 is a plot of fan blade pitch angle versus percent pedal depression according to the prior art.
Figure 6:
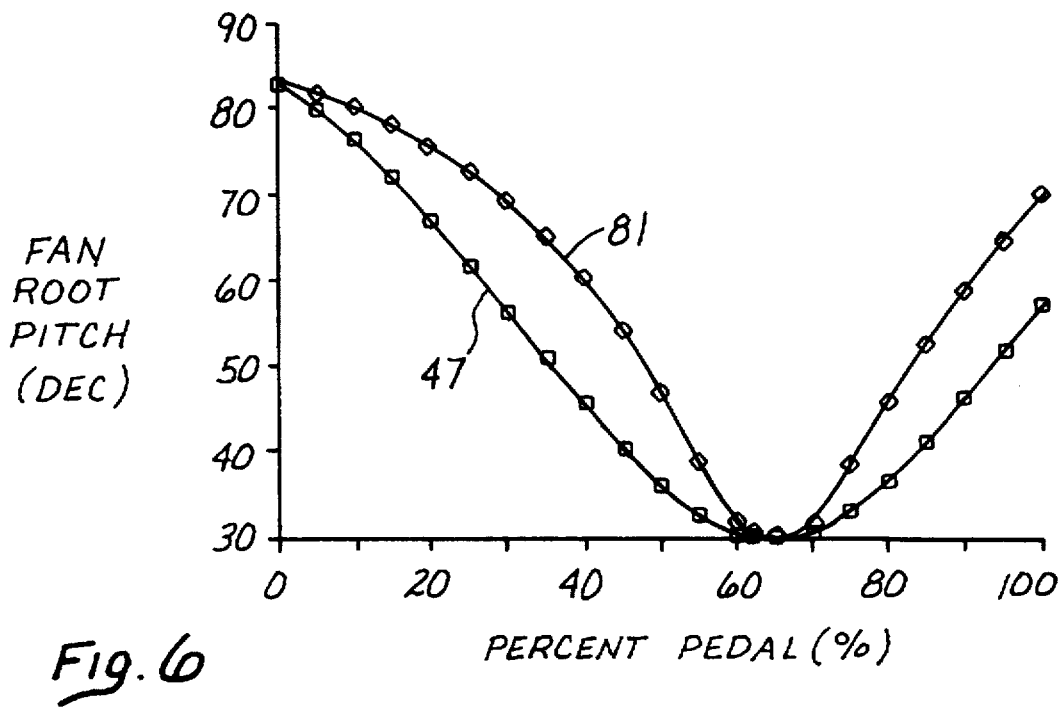
FIG. 6 is a plot of fan blade pitch angle versus percent pedal depression of both the slotted cam control system of the present invention and the gear-driven system of the prior art.

FIG. 6 compares a fan blade pitch angle versus pedal depression plot 81 of the slotted cam system of the present invention with the prior art gear system plot 47. The plot 81 shows the movement according to the presently preferred embodiment. Other movements may be designed by changing the curvature of the cam slot, and in particular, changing the cam fillet radius 79.

Unlike the prior art, the present invention does not have a large flat spot at the transition area from decreasing fan blade pitch angle to increasing fan blade pitch angle. This slotted cam control system of the present invention is robust and allows flexibility and optimizing, or programming, the shape of the fan blade pitch angle versus pedal position curve, and is thus an improvement over the prior art which generally is limited to sinusoidal curves. The slotted cam control system of the present invention is easier to manufacture, compact, and provides flexibility in designing new systems. While the slotted cam control system has been described in the context of a direct jet thruster helicopter system, the slotted cam control system may also be used in any system where quick and crisp reversal of motion is advantageous.

Although an exemplary embodiment of the invention has been shown and described, many other changes, modifications and substitutions, in addition to those set forth in the above paragraph, may be made by one having ordinary skill in the art without necessarily departing from the spirit and scope of this invention.

I claim:

1. A cam control system for controlling pitch angles of fan blades of a relatively low-pressure-ratio fan within a fuselage of a helicopter, the relatively low-pressure-ratio fan directing a stream of air rearwardly into a tailboom of the helicopter, the stream of air being used for both a circulation control tailboom and left and right nozzles of a direct jet thruster, the slotted cam control system comprising:

a left foot rudder pedal movable in a forward and backward direction, forward movement of the left foot rudder pedal opening the right nozzle of the direct jet thruster and backward movement of the left foot rudder pedal closing the right nozzle of the direct jet thruster;

a right foot rudder pedal movable in a forward and backward direction, forward movement of the right foot rudder pedal opening the left nozzle of the direct jet thruster and backward movement of the right foot rudder pedal closing the left nozzle of the direct jet thruster;

a force-receiving arm movable in left and right directions;

translating means connected to the force-receiving arm, for translating a combination of both forward movement of the left foot rudder pedal and backward movement of the right foot rudder pedal into left movement of the force-receiving arm, and for translating a combination of both backward movement of the left foot rudder pedal and forward movement of the right foot rudder pedal into right movement of the force-receiving arm;

a track for contacting a portion of the force-receiving arm and for guiding movement of the portion of the force-receiving arm in a V-shaped, non-sinusoidal manner;

a force-applying arm operatively connected to the fan blades, the force-applying arm movable in forward and backward directions, a portion of the force-applying arm contacting the track and being guided by the track when the force-applying arm is moved in the forward and backward directions, the left movements of the force-receiving arm moving the force-applying arm forward and then backward, and the right movements of the force-receiving arm moving the force-applying arm backward and then forward, wherein forward movements of the force-applying arm change the pitch angles of the fan blades in a first direction, and backward movements of the force-applying arm change the pitch angles of the fan blades in a second direction.

2. The cam control system for controlling a pitch of a relatively low-pressure-ratio fan according to claim 1, wherein the track comprises a slot.

3. The cam control system for controlling a pitch of a relatively low-pressure-ratio fan according to claim 2, wherein the portion of the force-receiving arm comprises a wheel fitting into the slot.

4. The cam control system for controlling a pitch of a relatively low-pressure-ratio fan according to claim 3, wherein the portion of the force-applying arm comprises a wheel fitting into the slot.

5. The cam control system for controlling a pitch of a relatively low-pressure-ratio fan according to claim 4, wherein the wheel of the force-receiving arm is connected to the wheel of the force-applying arm.

6. The cam control system for controlling a pitch of a relatively low-pressure-ratio fan according to claim 1, wherein the track comprises a curved central portion located between two relatively straight portions.

7. The cam control system for controlling a pitch of a relatively low-pressure-ratio fan according to claim 6, wherein a curvature of the curved central portion of the track determines a rate at which the pitch angles of the fan blades move between the pitch angles in the first and second directions.

8. The cam control system for controlling a pitch of a relatively low-pressure-ratio fan according to claim 6, wherein the track has an approximate V-shape.

9. The cam control system for controlling a pitch of a relatively low-pressure-ratio fan according to claim 6, wherein the curved central portion of the track guides the portion of the force-receiving arm in substantially left and right directions, without any forward and backward direction components.

10. The cam control system for controlling a pitch of a relatively low-pressure-ratio fan according to claim 9, wherein the pitch angles of the fan blades vary substantially at a minimum, minimizing the stream of air generated by the fan, when the portion of the force-applying arm is at the curved central portion of the track.

11. The cam control system for controlling a pitch of a relatively low-pressure-ratio fan according to claim 10, wherein the pitch angles of the fan blades vary substantially at the minimum when the left direct jet thruster nozzle and the right direct jet thruster nozzle are both substantially closed.

12. The cam control system for controlling a pitch of a relatively low-pressure-ratio fan according to claim 6, wherein the curved central portion of the track guides the portion of the force-applying arm in substantially forward and backward directions, without any left and right direction components.

13. The cam control system for controlling a pitch of a relatively low-pressure-ratio fan according to claim 12, wherein the pitch angles of the fan blades vary according to the sizes of the left and right direct jet thruster openings.

14. A slotted cam control system for controlling a pitch of a fan, which compresses air into an aft portion of a fuselage of a helicopter, the compressed air being selectively discharged through a circulation control tailboom and left and right openings of a direct jet thruster, the slotted cam control system comprising:

a force-receiving arm for receiving left and right forces from a user, the left and right forces corresponding to instructions to steer the helicopter left and right, respectively;

guiding means for guiding a portion of the force-receiving arm in a right and backward direction for a first predetermined distance and then guiding the portion of the force-receiving arm in a right and forward direction for a second predetermined distance, when the right force is applied to the force-receiving arm, the guiding means also guiding the portion of the force-receiving arm in a left and backward direction for the second predetermined distance and then guiding the portion of the force-receiving arm in a left and forward direction for the first predetermined distance, when the left force is applied to the force-receiving arm;

a force-applying arm for applying forward and backward forces to the fan in order to change the pitch angles of the fan blades, the forward forces being applied to the fan when the portion of the force-receiving arm is guided in a right and forward direction for the second predetermined distance and when the portion of the force-receiving arm is guided in the left and forward direction for the first predetermined distance, the backward forces being applied to the fan when the portion of the force-receiving arm is guided in a right and backward direction for the first predetermined distance and when the portion of the force-receiving arm is guided in the left and backward direction for the second predetermined distance, wherein the guiding means comprises a third predetermined distance located between the first predetermined distance and the second predetermined distance, the guiding means guiding the portion of the force-receiving arm along a non-sinusoidal, V-shaped curve in substantially left and right directions along the third predetermined distance.

15. The slotted cam control system for controlling a pitch of a fan according to claim 14, wherein the left and right forces from the user are generated from left foot rudder and right foot rudder pedals, respectively, wherein the left foot rudder pedal is movable in forward and backward directions, forward movement of the left foot rudder pedal opening the right opening of the direct jet thruster and backward movement of the left foot rudder pedal closing the right opening of the direct jet thruster, and wherein the right foot rudder pedal is movable in forward and backward directions, forward movement of the right foot rudder pedal opening the left opening of the direct jet thruster and backward movement of the right foot rudder pedal closing the left opening of the direct jet thruster.

16. A slotted cam control system for providing a quick reversal of motion to a movable object, the slotted cam control system comprising:

a force-receiving arm having a force-receiving end and a first tracking end, the force-receiving end either receiving a pushing-reception force along a length of the force-receiving arm in a direction toward the first tracking end or receiving a pulling-reception force along the length of the force-receiving arm in a direction away from the first tracking end;

a force-applying arm having a second tracking end and a force-applying end, the force-applying end either applying a pushing-application force along a length of the force-applying arm in a direction away from the second tracking end or applying a pulling-application force along the length of the force-applying arm in a direction toward the second tracking end, the force-applying end being operatively connected to the movable object; and a V-shaped track having a non-sinusoidal shape and being adapted for guiding the first tracking end and the second tracking end along the V-shape to thereby quickly translate the pushing and pulling reception forces into the pushing and pulling application forces, respectively.

17. The tracking system for providing a quick reversal of motion to a movable object according to claim 16, wherein the force-applying end operatively connected to the movable object rotates the object in a first predetermined fashion when the first reception force is applied to the force-receiving end of the force-receiving arm, and wherein the force-applying end operatively connected to the movable object rotates the object in a second predetermined fashion when the second reception force is applied to the force-receiving end of the force-receiving arm.

18. The tracking system for providing a quick reversal of motion to a movable object according to claim 16, wherein the force-receiving arm is substantially perpendicular to the force-applying arm.

19. The tracking system for providing a quick reversal of motion to a movable object according to claim 16, wherein the first and second tracking ends comprise two rollers connected together.

20. The cam control system as recited in claim 1, the track comprising a V-shape defined by two legs and a transition segment between the two legs, each of the two legs having an intermediate portion which is curved inwardly toward the intermediate portion of the other leg.

21. The cam control system as recited in claim 20, the V-shaped track being non-symmetrical about an axis bisecting the V-shaped track.

22. The cam control system as recited in claim 1, the track comprising a V-shape defined by a first leg, a second leg, and a transition segment connecting the two legs, the first leg extending in a forward and left direction from the transition segment and the second leg extending in a forward and right direction from the transition segment, each of the first leg and the second leg having both a vertical and a horizontal component, and the transition segment having a substantially horizontal component which is less than a horizontal component that a transition segment having a sine waveform shape would have.

23. The cam control system as recited in claim 22, each of the two legs having an intermediate portion which is curved inwardly toward the intermediate portion of the other leg.

24. The cam control system as recited in claim 14, the first predetermined distance being unequal to the second predetermined distance.

25. The cam control system as recited in claim 14, the track comprising a V-shape defined by two legs and a transition segment between two legs, the V-shaped track being non-symmetrical about an axis bisecting the V-shaped track.

26. The cam control system as recited in claim 14, the track defining a V-shape having two legs and a transition segment between the two legs, each of the two legs having an intermediate portion which is curved inwardly toward the intermediate portion of the other leg.

27. The cam control system as recited in claim 14, the track having a V-shape and being defined by two legs and a transition segment connecting the two legs, the transition segment having a curvature which resembles a portion of a sine-squared waveform, as distinguished from a portion of a sine waveform.

28. The cam control system as recited in claim 16, the V-shaped track being defined by two legs and a transition segment connecting the two legs, the transition segment having a curvature which resembles a portion of sine-squared waveform, as distinguished from a portion of a sine waveform.

29. The cam control system as recited in claim 16, the V-shaped track being non-symmetrical about an axis bisecting the V-shaped track.

* * * * *